(12) United States Patent
Berger et al.

(10) Patent No.: US 9,303,793 B2
(45) Date of Patent: Apr. 5, 2016

(54) CABLE OR CONDUIT RECEIVING DEVICE, PACKING MEANS HANDLING MACHINE OR SYSTEM, AND CONDUIT CARRIER FOR A CABLE OR CONDUIT SUPPORT

(71) Applicant: KHS GmbH, Dortmund (DE)

(72) Inventors: Thomas Berger, Glashutten (DE); Eberhard Sendobry, Rimbach (DE); Thomas Detemple, Planegg (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 14/358,250

(22) PCT Filed: Sep. 28, 2012

(86) PCT No.: PCT/EP2012/004075
§ 371 (c)(1),
(2) Date: May 15, 2014

(87) PCT Pub. No.: WO2013/071995
PCT Pub. Date: May 23, 2013

(65) Prior Publication Data
US 2014/0299718 A1    Oct. 9, 2014

(30) Foreign Application Priority Data

Nov. 16, 2011   (DE) .......................... 10 2011 118 621

(51) Int. Cl.
*F16L 3/22* (2006.01)
*F16L 3/24* (2006.01)
*H02G 3/30* (2006.01)

(52) U.S. Cl.
CPC ... *F16L 3/24* (2013.01); *H02G 3/30* (2013.01)

(58) Field of Classification Search
CPC .................................... F16L 3/24; H02G 3/30
See application file for complete search history.

(56) References Cited

U.S. PATENT DOCUMENTS

| | | | |
|---|---|---|---|
| 8,596,590 B2 * | 12/2013 | McCoy | 248/68.1 |
| 2010/0038129 A1 | 2/2010 | Handler | |
| 2010/0140422 A1 * | 6/2010 | McGrath et al. | 248/68.1 |
| 2013/0092801 A1 * | 4/2013 | Lares | 248/68.1 |

FOREIGN PATENT DOCUMENTS

| | | |
|---|---|---|
| DE | 1732558 | 10/1956 |
| DE | 2059709 | 6/1972 |
| DE | 112559 | 4/1975 |
| DE | 20 2009 015 319 | 3/2010 |
| EP | 1 808 945 | 7/2007 |
| WO | WO2005/095836 | 10/2005 |

* cited by examiner

Primary Examiner — Amy Sterling
(74) Attorney, Agent, or Firm — Occhiuti & Rohlicek LLP (57) ABSTRACT

A conduit-receiving device for receiving a conduit on a packing means handling machine has conduit carriers held along a course of the conduit-receiving device. The carriers are spaced apart from one another by being latched to a wall element of the machine. Each conduit carrier has a base section adjacent to the wall element, and an upper arm section that latches to a first profile section of the wall element to hold the conduit carrier. The upper arm section projects away from the base section. The conduit carrier is held to a second profile section of the wall element by a rear of the base section.

16 Claims, 6 Drawing Sheets

CABLE OR CONDUIT RECEIVING DEVICE, PACKING MEANS HANDLING MACHINE OR SYSTEM, AND CONDUIT CARRIER FOR A CABLE OR CONDUIT SUPPORT

RELATED APPLICATIONS

This application is the national stage entry under 35 USC 371 of PCT application PCT/EP2012/004075, filed Sep. 28, 2012 which claims the benefit of the Nov. 16, 2011 priority date of German application 10 2011 118 621.6, the contents of which are herein incorporated by reference.

FIELD OF INVENTION

The invention relates to a cable or conduit receiving devices, to a packing means handling machine, and to conduit carriers.

BACKGROUND

There are known conduit carriers for installation purposes. One example of such a conduit carrier is configured as an L-section having two arms running at right angles to one another. Other examples have one base arm or base section and, projecting away from the latter at right angles, one arm section that forms the support for cables and/or conductors.

These known conduit carriers are configured to be mounted onto top-hat rails in such a way that the base arm is screw-mounted onto a respective top-hat rail that is, in turn, fixed to a substrate, for example an electrical installation. The manner of fixing and the need to use a top-hat rail alone makes the mounting of these known conduit carriers time-consuming and costly.

SUMMARY

An object of the invention is to provide a conduit receiving device that can be realized in a simple way to receive a plurality of cables and conductors.

As used herein, "packing means" refers to packages or containers usually used, in among other places, in the food industry and specifically also in the drinks sector. "Packing means" includes containers such as bottles, cans, and soft packages, for example those produced from cardboard and/or plastic film and/or metal film, as well as transport containers, such as bottle cases.

"Packing means handling machines or packing means handling systems" refers to machines or systems, including those comprising a plurality of individual machines or units, that are used to produce and/or handle packing means, for example for the cleaning and/or sterilizing and/or filling and/or sealing and/or labelling and/or printing and/or packing and/or bringing together of packaging means, in particular machines or systems used in the drinks industry.

"Conduits" include electrical conductors or cables of various types, such as electrical supply lines and data transmission lines, including those for transmitting measured values, etc. Conduits also include conduits for liquid, gaseous and/or vaporous media.

For the purpose of the invention the expressions "essentially", "in essence" or "around" mean variations from the respective exact value by +/−10%, preferably by +/−5% and/or variations in the form of changes insignificant for the function.

It is a particular advantage of the invention that the conduit carriers that form the cable support are attached solely by way of latching or clipping to at least one wall element of the packing means handling machine or system, preferably by direct latching to the wall element, i.e. without the use of other components for mounting or attachment, and without special mounting tools. The conduit carriers can be inexpensively produced as moldings, for example from plastic, with all functional elements required for mounting or attachment.

The wall element in this case is, for example, part of a machine housing or of an enclosure surrounding a machine or the system or of a carrier system extending along a system.

Further embodiments, advantages and possible applications of the invention arise out of the following description of embodiments and out of the figures. The content of the claims is also made an integral part of the description.

BRIEF DESCRIPTION OF THE DRAWINGS

The invention is explained in detail below through the use of embodiment examples with reference to the figures. In the figures, in which.

DETAILED DESCRIPTION

Figure 1:
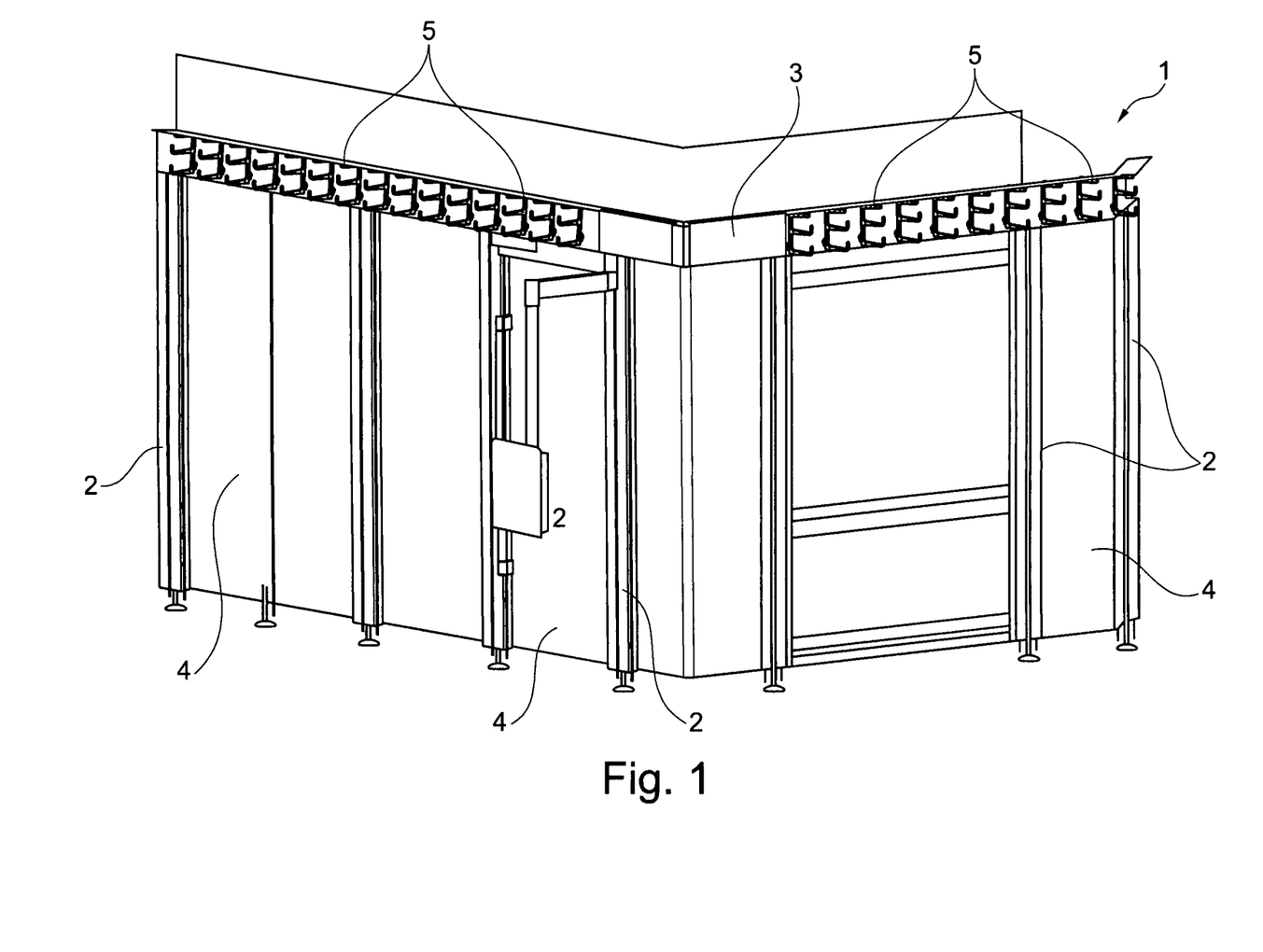
FIG. 1 shows a simplified partial representation of an enclosure of a machine, for example of a machine for handling packing means in the form of containers, together with a conduit carrier array formed by a plurality of cable or conduit carriers.

A enclosure 1 encloses a machine or system (not shown), for example, a machine and system for handling containers. In the illustrated embodiment, the enclosure 1 has vertical pillar-like struts 2 standing with their lower ends on a substrate, and a plurality of wall elements 3 interconnecting the tops of struts 2, and large-sized wall elements 4 that also close off the interior of the enclosure 1 to separate it from the outside.

A plurality of cable or conduit carriers 5 is provided on the outside of the enclosure 1. These cable or conduit carriers 5 together constitute a conduit carrier array or conduit receiving device for receiving cables or conduits that are laid on the outside of enclosure 1, specifically on an upper region thereof.

Figure 2:
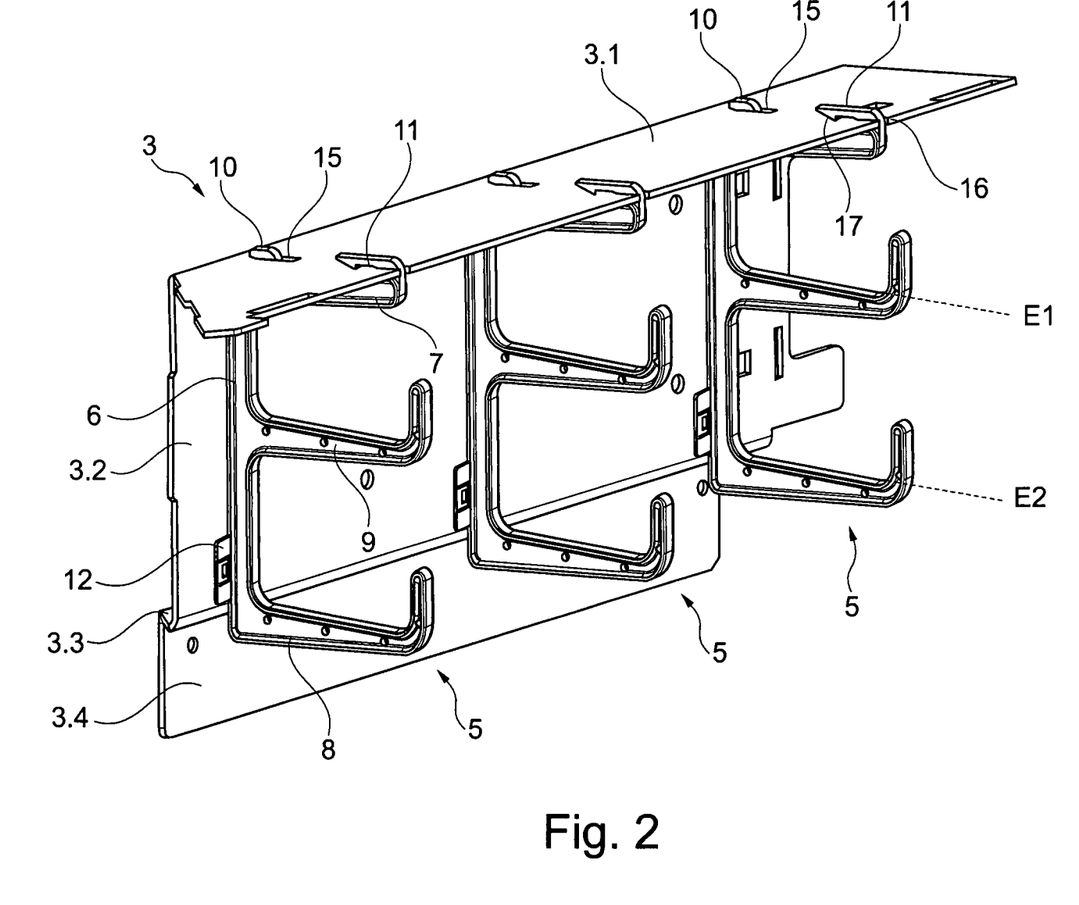
FIG. 2 shows an enlarged perspective single representation of a wall element in front view with a plurality of conduit carriers provided thereon.
Figure 3:
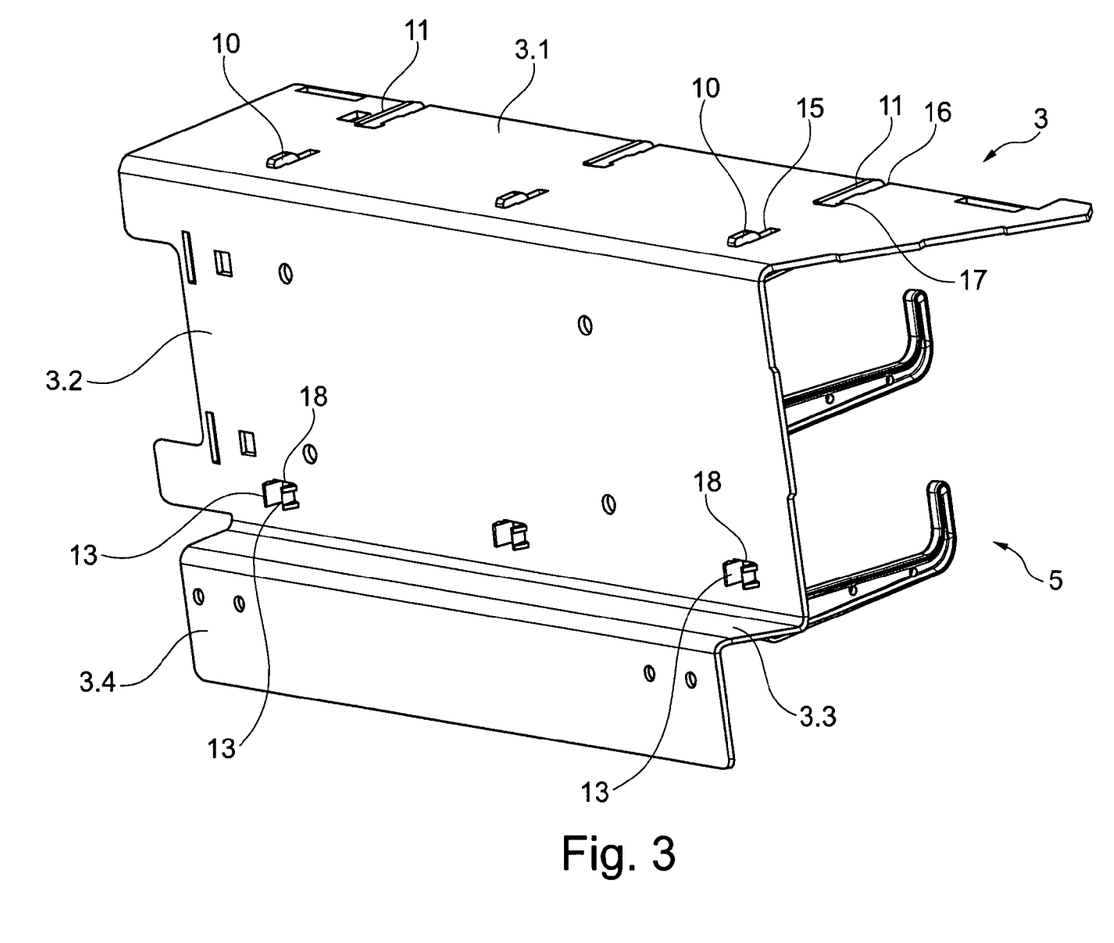
FIG. 3 shows a perspective rear view of the wall element of FIG. 2 with the conduit carriers.

As FIGS. 2 and 3 show, a wall element 3 is produced as an angled-section from a flat piece of metal, preferably from a corrosion-resistant sheet steel, by cutting and bending.

The wall element 3 has an upper profile section 3.1 that, in the assembled condition, is arranged with its surface sides in horizontal or essentially horizontal planes and that projects over the remaining outside of the enclosure 1.

The wall element 3 also has an upper-middle profile section 3.2 that abuts the upper-profile section 3.1 at right angles. The upper-profile section 3.1, in the assembled condition, is arranged with its surface sides in vertical or in essentially vertical planes.

The wall element 3 also has a lower-middle profile section 3.3 which abuts the upper-middle profile section 3.2 at right angles and is oriented parallel to the upper profile section 3.1.

The wall element 3 also has a lower profile section 3.4 that abuts the lower-middle profile section 3.3 at right angles and that is oriented parallel to the upper-middle profile section 3.2. The lower-middle profile section 3.3 is much narrower than the upper profile section 3.1 and projects from the upper-middle profile section 3.2 over the rear of a wall element 3 that faces away from the upper profile section 3.1. The respective wall element 3 is attached to the enclosure 1 or to vertical elements 2 by for example, the lower profile section 3.4.

In a manner described in greater detail below, conduit carriers 5, which are each produced as a one-piece molding from a suitable material, e.g. from an elastic and adequately resilient material, for example plastic, are held solely by latching to a respective wall element 3 and in such a manner that they are located below the upper profile section 3.1 at the front of wall element 3 within or essentially within the angular range formed between the upper and upper-middle profile sections 3.1 and 3.2. The conduit carrier 5 defines planes E1 and E2 superimposed vertically, i.e. in an axial direction square to the planes of the upper profile section 3.1. Each conduit carrier 5 receives a plurality of cables or conduits.

Described in detail, each conduit carrier 5 has a rear base section 6 and upper, middle, and lower arm sections 7, 8, 9 that project out from a common side of the rear base section 6. In the depicted embodiment, the three arm sections 7, 8, 9 are parallel or essentially parallel. At their end facing away from the rear base section 6, the middle and lower arm sections 8, 9 each form a hook, best seen in FIG. 4, having an upward-pointing partial section 8.1 and 9.1 respectively. Each of the middle and lower arm sections 8, 9 forms, with an upper side thereof that faces the upper arm section 7, a support for the conduits or cables, which are not shown in the figures. The shape of the conduit carriers 5 can also be described by stating that each conduit carrier 5 is a C-shaped bow comprising an upper arm section 7, a lower arm section 8, a base section 6 and having a middle arm defined by a middle arm section 9.

Figure 4:
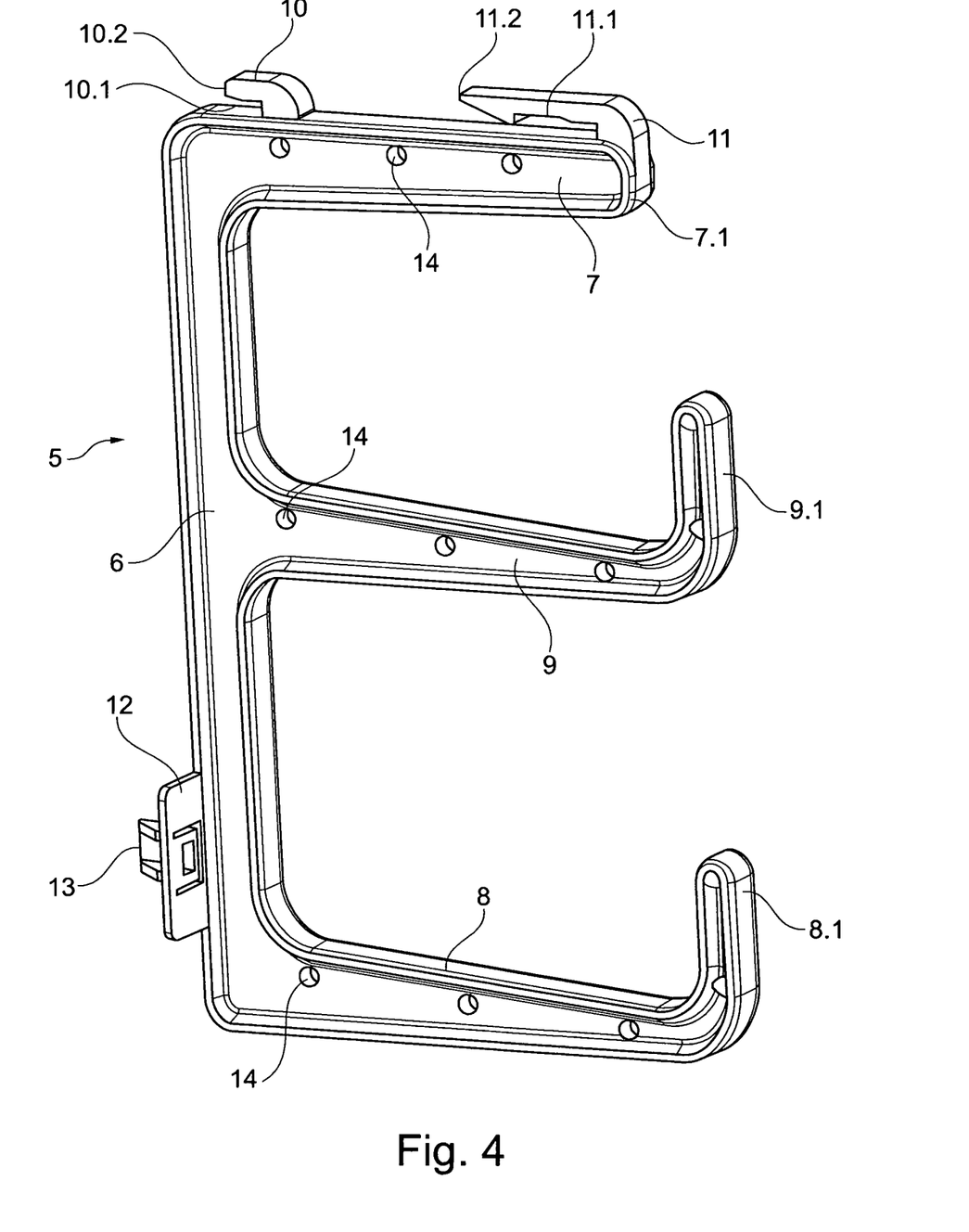
FIG. 4 shows one of the cable or conduit carriers in perspective single representation.

First and second hook-like holding-and-connecting elements 10, 11 are molded on the upper arm section 7 to make a connection to the wall element 3. Each holding-and-connecting element 10, 11 has a corresponding hook opening 10.1, 11.1 that opens toward the rear base section 6. Each holding-and-connecting element 10, 11 ends in free hook ends 10.2 and 11.2 that are oriented towards the rear base section 6.

The first holding-and-connecting element 10 is located near the rear base section 6. The second holding-and-connecting element 11 is located near the free end 7.1 of the upper arm section 7 and merges into the upper arm section 7 near the free end 7.1. At its free hook end 11.2, the second holding-and-connecting element 11 is formed as a detent with a corresponding detent barb.

On its rear side facing away from the arm sections 7, 8, 9, the rear base section 6 is configured in the lower region, i.e. near where it merges into the middle arm section 8, with a panel-shaped extension 12 whose surface sides lie in planes perpendicular to the longitudinal extensions of the arm sections 7, 8, 9. On the rear side facing away from rear base section 6, the panel-shaped extension 12 forms a large-area contact surface having two detent tabs 13, best seen in FIGS. 3 and 4. The latter are offset relative to one another perpendicular to the longitudinal extension of the rear base section 6.

Figure 5:
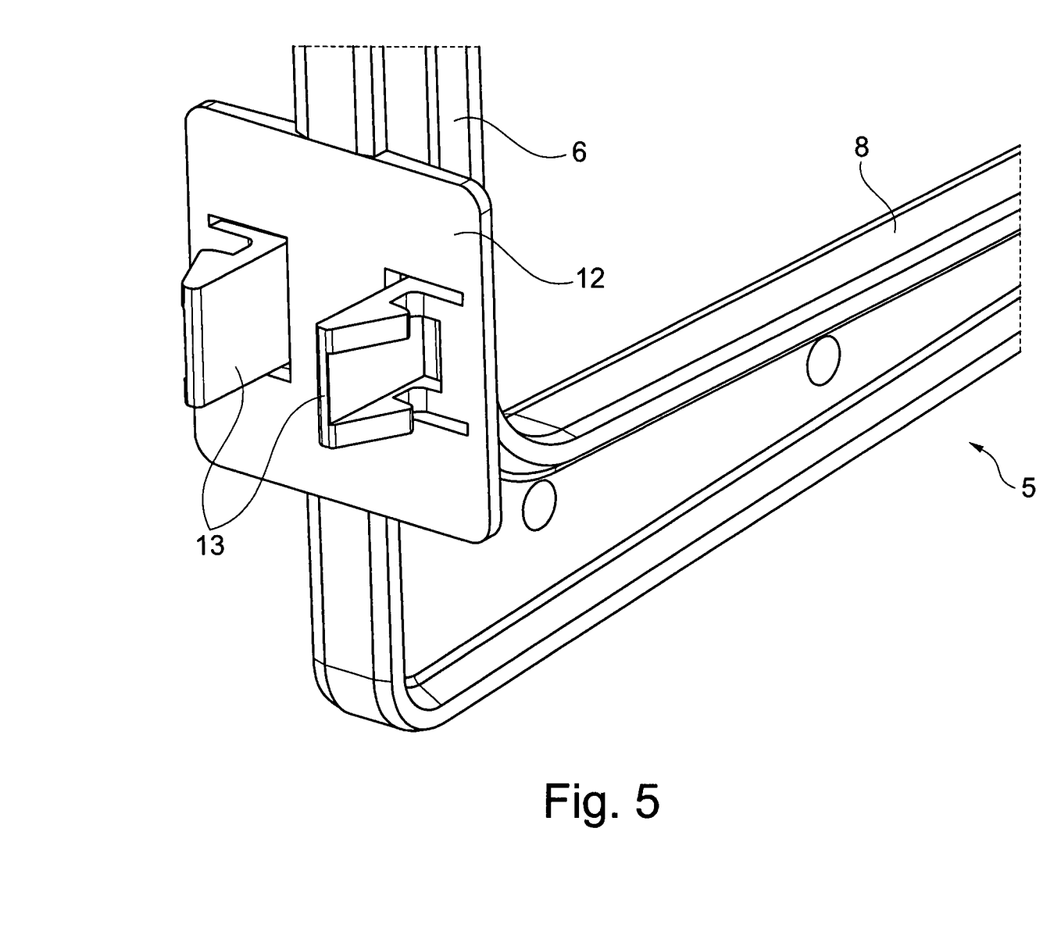
FIG. 5 shows an enlarged perspective partial representation of the conduit carrier of FIG. 4.

As can also be seen from FIGS. 4 and 5 in particular, each conduit carrier 5 has an I-shaped or double-T-shaped cross-section in the region of the rear base section 6 and arm sections 7, 8, 9. This enables the conduit carrier 5 to possess the necessary strength despite a reduced material consumption. The arm sections 7, 8, 9 are also provided with through openings 14 that are used, for example, to secure the cables or conduits with the use of appropriate securing elements, for example cable ties.

Slots or openings 15-18 for connecting elements 10 and 11 and for detents 13 are provided in wall elements 3 in a given grid pattern as follows: in the upper profile section 3.1, openings 15 for connecting elements 10 in the vicinity of the transition to the upper-middle profile section 3.2, openings 16 that are open at the edge for connecting element 11, and openings 17 for the detent tabs at hook end 11.2, and openings 18 in the upper-middle profile section 3.2, each of which is provided for the two detent tabs 13 of each conduit carrier 5. The openings constitute openings groups, each exhibiting an opening 15, 16, 17, 18 and being used to connect one conduit carrier 5. Openings 15-18 of each openings group are arranged in a common plane oriented perpendicular to the profile sections 3.1-3.4 and in the longitudinal direction of wall element 3 at intervals determined by the given grid dimension.

Each conduit carrier is fitted to the wall element 3 or to the openings group concerned by pushing the two connecting elements 10 and 11 and detent tabs 13 respectively into associated openings 15 and 16 and 18 such that connecting elements 10 and 11 engage over the top of the upper profile section 3.1 at the edge of associated opening 15 and 16 respectively, by engaging hook end 11.2 of the detent tab in opening 17 from the top of the upper profile section 3.1, and by snapping detent tabs 13 into associated opening 18, with the base section with extension 12 lying against the front of the upper-middle profile section 3.2 and concealing opening 18.

When fitted therefore, a conduit carrier 5 is immediately adjacent, by its upper arm section 7, to the underside of the upper profile section 3.1, and by the longitudinal extension of rear base section 6 oriented vertically or essentially vertically or perpendicular to the plane of the upper profile section 3.1, and disposed immediately adjacent to the front or outer surface of the upper-middle profile section 3.2. Each conduit carrier 5 also lies with its base section 6 and with the side of the panel-shaped extension 12, which faces away from base section 6 up against the front of the upper-middle profile section 3.2, and with the lower end of base section 6 projecting downward somewhat beyond the lower-middle profile section 3.3.

Figure 6:
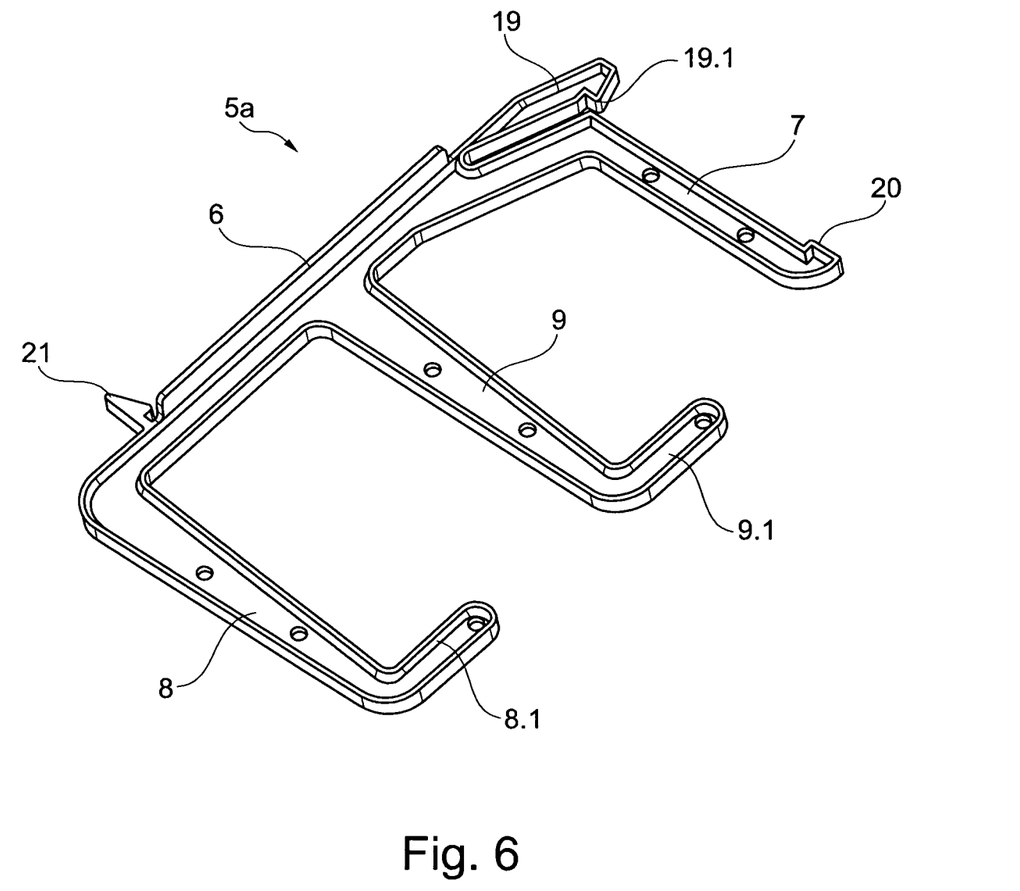
FIG. 6 shows a further embodiment of the inventive cable or conduit carrier in a representation similar to FIG. 4.

FIG. 6 shows, in perspective single representation, a further embodiment of a conduit carrier 5a that is formed as a C-shaped bow with an upper arm section 7, a lower arm section 8 and a base section 6, as well as with the middle arm formed by an arm section 9 as a one-piece molding, e.g. produced from plastic or another suitable material. This second conduit carrier 5a differs from the first conduit carrier 5 essentially in the shape of its fitting or connecting elements. Instead of the two connecting elements 10 and 11, the base section 6 has, at its upper end, a flexible latching or connecting element 19 that forms a detent tab 19.1, and the upper arm section 7 is configured at its free end 7.1 with an upstand 20 that projects above the upper side of arm section 7 facing away from the arm section 9. A retaining lug 21, which forms a detent, is also integrally molded in the lower region of conduit carrier 5a, i.e. near the transition of the base section 6 and the arm section 8 on the rear of base section 6 facing away from the arm sections 7, 8, 9. The second conduit carrier 5a may also be fitted, instead of the first conduit carrier 5, to a wall element 3 by snapping the connecting element 19 with its detent tab 19.1 into the opening 15, in which case the detent tab 19.1 now engages over the edge of the opening 15 that faces away from the upper-middle profile section 3.2, the upstand 20 is received in the opening 16 that is open to the edge, and the retaining lug 21 is received in the opening 18, with its detent tab engaging over the upper edge of the opening 18 facing the upper profile section 3.1.

The cable or conduit receiving device formed by the conduit carriers 5, 5a which are fitted to wall elements 3 replaces the currently customary and complex cable baskets while keeping the advantages of the optimal accessibility of the cables or conduits laid on conduit carriers 5, 5a, for example for cleaning and/or repair purposes, etc. Because the conduit-receiving device is accessible from the side, it is also easily possible to provide further cables or conduits on the conduit carriers 5, 5a or to remove conduits from conduit carriers 5, 5a as the need arises. Conduit carriers 5 can also be used to realize corners and/or junctions in the respective conduit or cable carrier without difficulty.

A further advantage of the conduit carriers 5, 5a is that they can be produced inexpensively as moldings and they facilitate a simple and time-saving assembly procedure by way of latching, especially since the openings 15-18, which are required for the mounting of conduit carriers 5, 5a, can be produced quickly and inexpensively, e.g. by laser cutting, and at the same time as the sheet metal blanks that are used for the wall elements 3.

The invention has been described hereinbefore by reference to embodiments. It goes without saying that numerous variations as well as modifications are possible without departing from the inventive concept underlying the invention.

LIST OF REFERENCE CHARACTERS

1 Enclosure
2 Support or vertical strut
3, 4 Wall element
3.1-3.4 Profile section
5, 5a Conduit carrier
6 Base section
7,8,9 Arm section
7.1, 8.1, 9.1 Free end of the arm section
10,11 Holding or connecting element
10.1, 11.1 Hook opening
10.2, 11.2 Free hook end
12 Panel-shaped extension
13 Detent tab
14 Opening
15, 16, 17, 18 Opening
19 Connecting element
19.1 Detent tab
20 Upstand
21 Locating lug or connecting element
E1, E2 Plane

The invention claimed is:

1. An apparatus comprising a conduit-receiving device for receiving a conduit on a packing means handling machine, said conduit-receiving device comprising a plurality of conduit carriers, wherein said conduit carriers are held along a course of said conduit-receiving device, wherein said conduit carriers are spaced apart from one another, wherein said conduit carriers are latched to a wall element of said machine, wherein each conduit carrier comprises a base section, wherein said base section is adjacent to said wall element, wherein each conduit carrier comprises an upper arm section, wherein said upper arm section latches to a first profile section of said wall element to hold said conduit carrier, wherein said upper arm section projects away from said base section, and wherein said conduit carrier is held to a second profile section of said wall element by a rear of said base section.

2. The apparatus of claim 1, wherein each conduit carrier comprises a vertical base section and a supporting arm section, wherein said vertical base section is adjacent to said wall element, wherein said supporting arm section projects away from said base section, and wherein said supporting arm section forms a support for conduits.

3. The apparatus of claim 1, wherein said conduit carriers are bow-like.

4. The apparatus of claim 1, wherein said conduit carriers have an L-profile.

5. The apparatus of claim 1, wherein said conduit carriers have a C-profile.

6. The apparatus of claim 1, wherein each of said conduit carriers is C-shaped, wherein each of said conduit carries comprises a lower arm section, and wherein said lower arm section forms a support for said conduits.

7. The apparatus of claim 6, further comprising a middle arm section between said upper arm section and said lower arm section, wherein said middle arm section forms a support for said conduits.

8. The apparatus of claim 2, wherein said supporting arm section comprises a free end, and wherein an upward pointing partial section is disposed at said free end.

9. The apparatus of claim 1, wherein said conduit carriers are each disposed with at least one partial region in an angle corner that is formed by at least one of said wall element and profile wall sections of said wall element.

10. The apparatus of claim 1, wherein said wall element comprises openings for mounting said conduit carriers, wherein said openings are spaced apart from one another, wherein said openings define an openings group for receiving a mounted conduit carrier, wherein said wall element comprises an angle section, wherein a first subset of said openings in said openings group is provided in a first profile section of said wall element, and wherein a second subset of said openings group is provided in a second profile section of said wall element.

11. The apparatus of claim 1, wherein each conduit carrier comprises a connecting element, wherein said connecting element comprises a hook, wherein said connecting element is disposed on an upper side of a structure selected from the group consisting of said conduit carrier and said upper arm section, and wherein said hook engages over said wall element in a region of an opening thereon.

12. The apparatus of claim 1, wherein each conduit carrier comprises a connecting element, wherein said connecting element comprises a sprung detent, wherein said connecting element is disposed on an upper side of a structure selected from the group consisting of said conduit carrier and said upper arm section, wherein said sprung detent engages said wall element in a region of an opening thereon.

13. The apparatus of claim 1, wherein each of said conduit carriers comprises a retaining element, wherein said retaining element is disposed at a rear of said base section, and wherein said retaining element engages behind said wall element.

14. The apparatus of claim 13, wherein said retaining element comprises a detent.

15. The apparatus of claim 13, wherein said retaining element comprises a retaining lug.

16. The apparatus of claim 1, further comprising a packing means handling machine connected to said conduit-receiving device.

\* \* \* \* \*